(12) United States Patent
Line et al.

(10) Patent No.: US 11,904,745 B2
(45) Date of Patent: Feb. 20, 2024

(54) SUPPORT ASSEMBLY FOR SEATING ASSEMBLY

(71) Applicant: Ford Global Technologies, LLC, Dearborn, MI (US)

(72) Inventors: Johnathan Andrew Line, Northville, MI (US); Sean Bayle West, Monroe, MI (US); Ratan Howlader, Novi, MI (US); Robert Charles Shipley, Plymouth, MI (US); Patrick Davis, Royal Oak, MI (US); Ian James, Windsor (CA); Nicholas Alphonse Billardello, Macomb, MI (US); David Frederick Lyons, New Haven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 474 days.

(21) Appl. No.: 17/201,071

(22) Filed: Mar. 15, 2021

(65) Prior Publication Data

US 2022/0289086 A1    Sep. 15, 2022

(51) Int. Cl.
*B60N 2/68*     (2006.01)
*B60N 2/20*     (2006.01)
*B60N 2/90*     (2018.01)

(52) U.S. Cl.
CPC .............. *B60N 2/682* (2013.01); *B60N 2/20* (2013.01); *B60N 2/995* (2018.02)

(58) Field of Classification Search
USPC ...... 296/65.01, 65.16, 65.09; 297/341, 378.1
See application file for complete search history.

(56) References Cited

U.S. PATENT DOCUMENTS

| | | | |
|---|---|---|---|
| 2,843,195 A | 7/1958 | Barvaeus | |
| 3,883,173 A | 5/1975 | Shephard et al. | |
| 7,086,700 B2 | 8/2006 | Habedank | |
| 7,255,399 B2 | 8/2007 | White et al. | |
| 7,264,310 B2 * | 9/2007 | Holdampf | B60N 2/66 297/284.9 |
| 8,038,198 B2 * | 10/2011 | Yamagishi | B60N 2/36 296/90 |
| 8,733,840 B2 * | 5/2014 | Westerink | B64D 11/064 297/316 |

(Continued)

FOREIGN PATENT DOCUMENTS

FR    2562003 A1    10/1985
GB    2426192 A    11/2006
(Continued)

*Primary Examiner* — Amy R Weisberg
*Assistant Examiner* — Veronica M Shull
(74) *Attorney, Agent, or Firm* — Vichit Chea; Price Heneveld LLP (57) ABSTRACT

A vehicle seating assembly is provided that includes a seatback and a seat that includes a seat frame and a support assembly. The support assembly is coupled to the seat frame and movable between an elevated position and a flattened position in response to an actuation force applied on the support assembly. The support assembly includes an extension member having a first end fixedly coupled to the seat frame and a second end rotatably coupled to the seat frame, and a plate having a first side rotatably coupled to the seat frame and a second side slidably coupled to the seat frame.

19 Claims, 7 Drawing Sheets

(56) References Cited

U.S. PATENT DOCUMENTS

| | | | |
|---|---|---|---|
| 8,931,844 B2* | 1/2015 | Line | B60N 2/3093 |
| | | | 297/340 |
| 9,187,019 B2* | 11/2015 | Dry | B60N 2/62 |
| 9,545,857 B2* | 1/2017 | Cooley | B60N 2/3065 |
| 9,776,543 B2 | 10/2017 | Line et al. | |
| 2006/0273644 A1 | 12/2006 | Sturt et al. | |

FOREIGN PATENT DOCUMENTS

| | | |
|---|---|---|
| GB | 2447309 A | 9/2008 |
| JP | H02147065 | 12/1990 |
| JP | 2009096423 A | 5/2009 |

* cited by examiner

SUPPORT ASSEMBLY FOR SEATING ASSEMBLY

FIELD OF THE DISCLOSURE

The present disclosure generally relates to a vehicle seating assembly.

BACKGROUND OF THE DISCLOSURE

Seating assemblies may include components that move between different positions to accommodate different seating functions. Improved movable components for seating assemblies are desired.

SUMMARY OF THE DISCLOSURE

According to a first aspect of the present disclosure, a vehicle seating assembly is provided. The vehicle seating assembly includes a seatback and a seat that includes a seat frame and a support assembly. The support assembly is coupled to the seat frame and movable between an elevated position and a flattened position in response to an actuation force applied on the support assembly. The support assembly includes an extension member having a first end fixedly coupled to the seat frame and a second end rotatably coupled to the seat frame and a plate having a first side rotatably coupled to the seat frame and a second side slidably coupled to the seat frame.

Embodiments of the first aspect of the present disclosure can include any one or a combination of the following features:
  the support assembly further includes an adjustment mechanism rotatably coupled to the seat frame, fixedly coupled to the extension member, and slidably coupled to the plate;
  the adjustment mechanism is rotatable about an adjustment mechanism axis of rotation extending through the seat frame and between an initial position and a final position as the support assembly moves from the elevated position to the flattened position;
  the actuation force includes a force exerted by the seatback in a folded position on the support assembly as the seatback moves from an upright position to the folded position;
  a seat leg disposed between the seat and a floor, wherein the seat leg moves from a first position to a second position as the seatback moves from the upright position to the folded position;
  the seat leg includes a first end rotatable about a first seat leg axis of rotation extending through the seat frame and a second end rotatable about a second seat leg axis of rotation proximate the floor;
  the adjustment mechanism includes a stop member disposed against the seat leg if the adjustment mechanism is in the initial position and the seat leg is in the first position and wherein the adjustment mechanism includes a stop member disposed against the seat leg if the adjustment mechanism is in the final position and the seat leg is in the second position;
  the adjustment mechanism rotates about the adjustment mechanism axis of rotation and between the initial position and the final position of the adjustment mechanism as the second end of the seat leg rotates about the second seat leg axis of rotation as the seat leg moves from the first position to the second position;
  the first seat leg axis of rotation and the adjustment mechanism axis of rotation are the same;
  the adjustment mechanism includes a bracket having a first link and a second link;
  the first link is fixedly coupled to the extension member and slidably coupled to the plate;
  the second link includes the stop member;
  the extension member includes a pair of opposing extension members disposed on opposing sides of the seat frame, wherein the adjustment mechanism includes a pair of opposing adjustment mechanisms disposed on opposing sides of the seat frame, and wherein the plate extends between each of the pair of opposing adjustment mechanisms; and/or
  the pair of opposing extension members include bolsters and wherein the plate includes a leg support.

According to a second aspect of the present disclosure, a vehicle seating assembly is provided. The vehicle seating assembly includes a seat, a seatback, and a support assembly disposed on a seat frame and movable between an elevated position and a flattened position in response to an actuation force. The support assembly includes a plate that includes a first side rotatably coupled to the seat frame and a second side rotatably coupled to the seat frame.

Embodiments of the second aspect of the present disclosure can include any one or a combination of the following features:
  the support assembly includes a pair of opposing extension members disposed along side brackets of a seating assembly frame and wherein the plate extends between each of the pair of extension members and transverse to each of the pair of extension members;
  the support assembly includes one or more rotating members coupled to the seating assembly frame, the pair of opposing extension members, and the plate, and wherein the one or more rotating members are movable between an initial position and a final position as the support assembly moves between the elevated position and the flattened position;
  a stop member coupled to the seating assembly and configured to limit rotation of the one or more rotating members in the initial position and the final position; and/or
  the second side of the plate is coupled to the one or more rotating members with a slot and a pin.

According to a third aspect of the present disclosure, a vehicle seating assembly is provided. The vehicle seating assembly includes a seat frame and a front mount disposed between the seat frame and a floor. The front mount includes a seat leg movable between an upward position and a downward position. The vehicle seating assembly also includes a support assembly coupled to the seat frame and movable between an elevated position and a flattened position in response to an actuating force. The support assembly includes a stop member abutting the seat leg and configured to limit movement of the support assembly if the seat leg is in the upward position and if the seat leg is in the downward position.

These and other aspects, objects, and features of the present disclosure will be understood and appreciated by those skilled in the art upon studying the following specification, claims, and appended drawings.

DETAILED DESCRIPTION

With reference to the vehicle seating assembly 10 described below and shown in the attached figures, a vehicle seating assembly 10 may be described from the vantage point of an occupant seated in the seating assembly 10. The side of a seating assembly 10 disposed on a right side of a seated occupant may be referred to as a right side of the seating assembly 10. The side of the seating assembly 10 disposed on a left side of a seated occupant may be referred to as a left side of the seating assembly 10.

Figure 1:
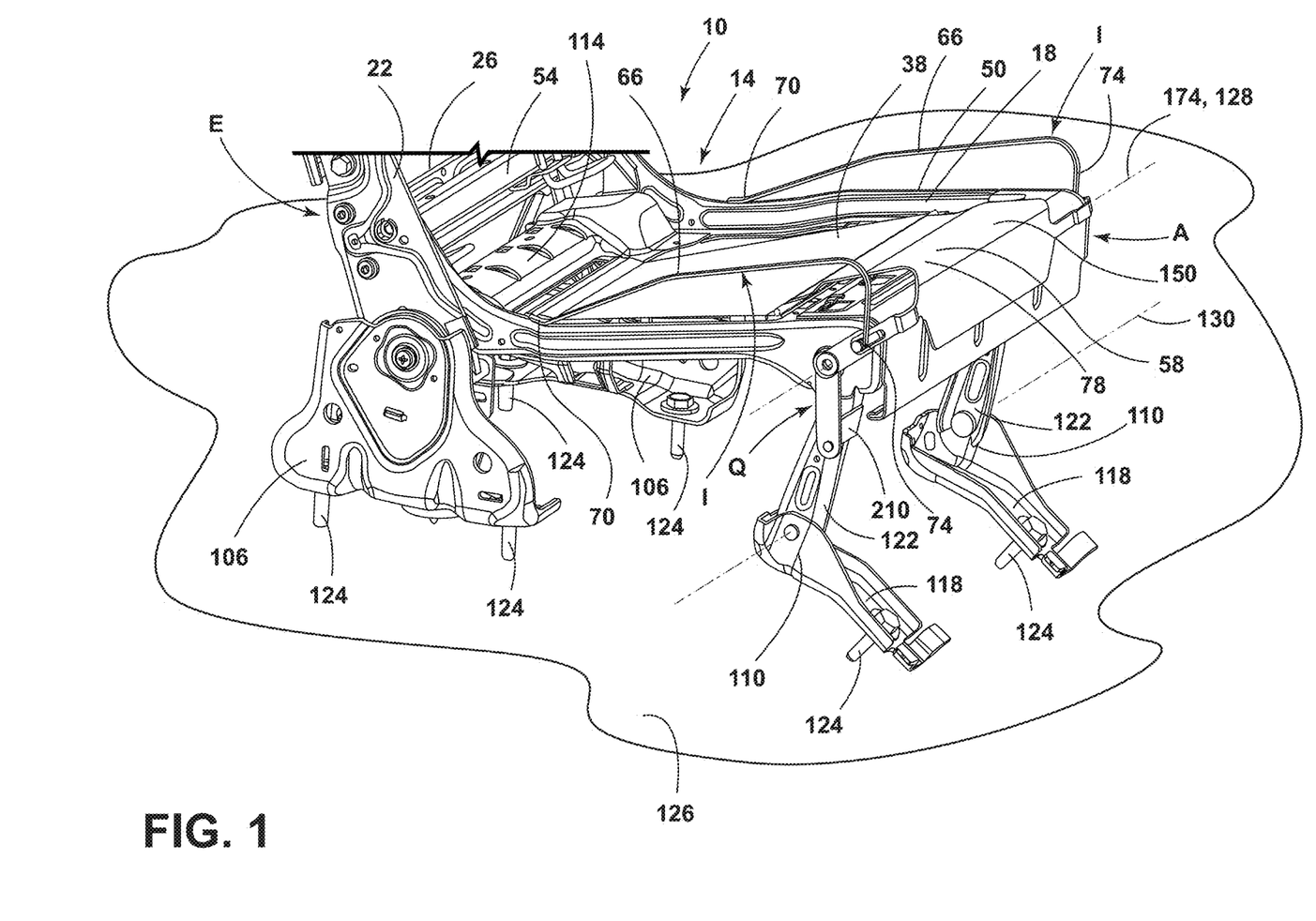
FIG. 1 is a right side perspective view of a portion of a seating assembly with a support assembly in an elevated position, according to an aspect of the disclosure.
Figure 2:
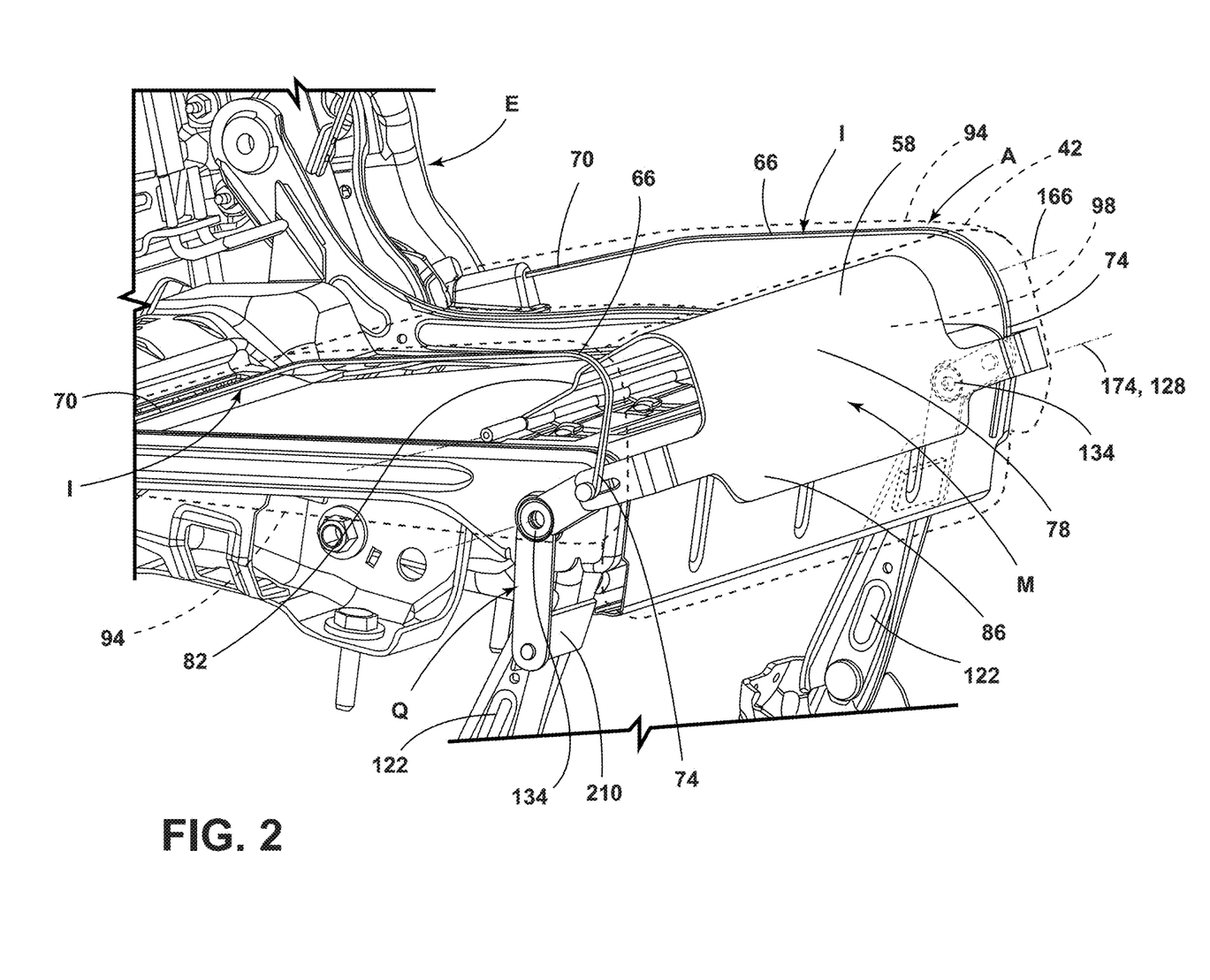
FIG. 2 is a right side perspective view of a portion of a seating assembly with a support assembly in an elevated position, according to an aspect of the disclosure.
Figure 7:
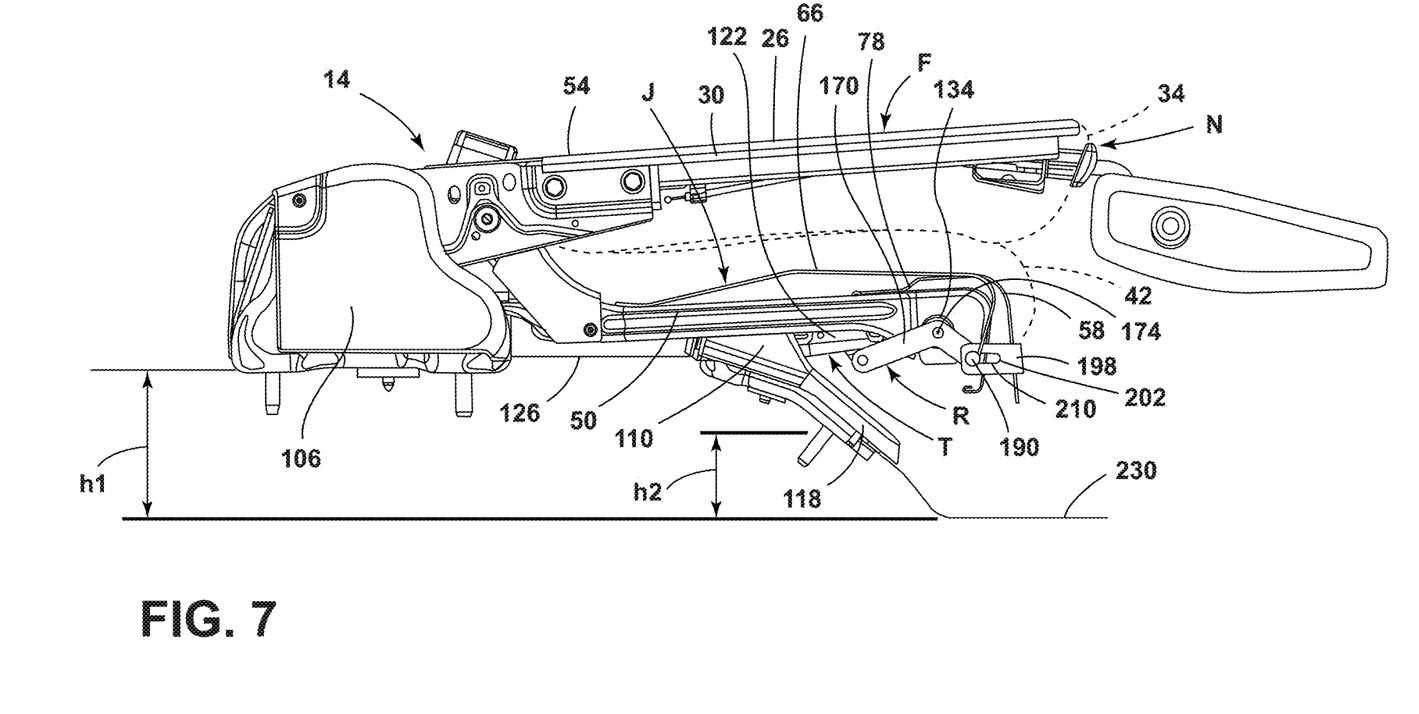
FIG. 7 is a right side elevational view of the seating assembly with the seatback in the folded position, according to an aspect of the disclosure.

Referring to FIG. 1, the seating assembly 10 may include a seating assembly frame 14. The seating assembly frame 14 may include a seat frame 18 and a seatback frame 22. A seatback panel 26 may be disposed on the back of the seatback frame 22. The seatback panel 26 may define the load floor 30 when the seatback is in the folded position F. The seatback panel 26 may provide support for a seatback cushion 34 disposed in the seatback frame 22. (FIG. 7.) A seat panel 38 may be positioned in the seat frame 18. The seat panel 38 may provide support for a seat cushion 42 disposed above the seat panel 38. (FIGS. 2, 7.)

Referring to FIGS. 1-7, a vehicle seating assembly 10 includes a seat 50 and a seatback 54. The seat 50 includes a seat frame 18 and a support assembly 58 coupled to the seat frame 18. The support assembly 58 is movable between an elevated position A and a flattened position B in response to an actuation force f applied on the support assembly 58. The support assembly 58 includes an extension member 66 having a first end 70 fixedly coupled to the seat frame 18 and a second end 74 rotatably coupled to the seat frame 18. The support assembly 58 includes a plate 78 having a first side 82 rotatably coupled to the seat frame 18 and a second side 86 slidably coupled to the seat frame 18. In the example shown, the first side 82 of the plate 78 may be attached to the seat frame 18 with a hinge that may extend along the top of the seat frame 18 and transverse to the extension members 66.

Customers desire a vehicle that may be used for various purposes. Therefore, it is advantageous to configure vehicle seating assemblies to use vehicle space in multiple ways. A seating assembly 10 that includes a support assembly 58 that may be configured in various ways. The seating assembly 10 may include a seatback 54 and a seat 50 with a support assembly 58 that may define bolsters 94 of the seat 50 and a leg support 98 of the seat 50. Bolsters 94 may stabilize the movement of a seated occupant during vehicle use. The leg support 98 may provide support to the legs of an occupant. The support assembly 58 may be in an elevated position A when the seatback is in an upright position E. The support assembly 58 may be flattened as the seatback 54 moves from the upright position E to the folded position F to create the load floor 30. Cargo may be disposed on the load floor 30. The support assembly 58 may be in the flattened position B when the seatback 54 is in the folded position F. As the seatback 54 is moved from the folded position F to the upright position E, the support assembly 58 may move from the flattened position B to the elevated position A. In the elevated position A, the support assembly 58 defines the bolsters 94 and the leg support 98 that create a comfortable seating space for an occupant.

Referring again to FIG. 1, the seating assembly 10 may be mounted to a vehicle floor 126 with rear mounts 106 and front mounts 110. Rear mounts 106 may be disposed on opposing sides of a cross bar 114 extending proximate the bite line of the seat 50. The bite line may refer to the location at which the seat 50 and the seatback 54 come together. The seating assembly 10 may include front mounts 110 positioned below a front portion 150 of the seat frame 18. The front mounts 110 may include bases 118 and seat legs 122 that may extend away from the seat frame 18 and toward the vehicle floor 126. The bases 118 may extend along the vehicle floor 126 to stabilize the seating assembly 10.

Referring again to FIG. 1, the rear mounts 106 and the front mounts 110 may be disposed on a vehicle floor 126 that may be have a higher elevation below the rear mounts 106 than below the front mounts 110. The higher elevation below the rear mounts 106 might be due to the placement of the rear mounts 106 above rear tires and/or a rear axle of the vehicle. The rear mounts 106 and the front mounts 110 may include pins 124 that may extend into the vehicle frame to secure the seating assembly 10 to the vehicle frame.

Figure 3:
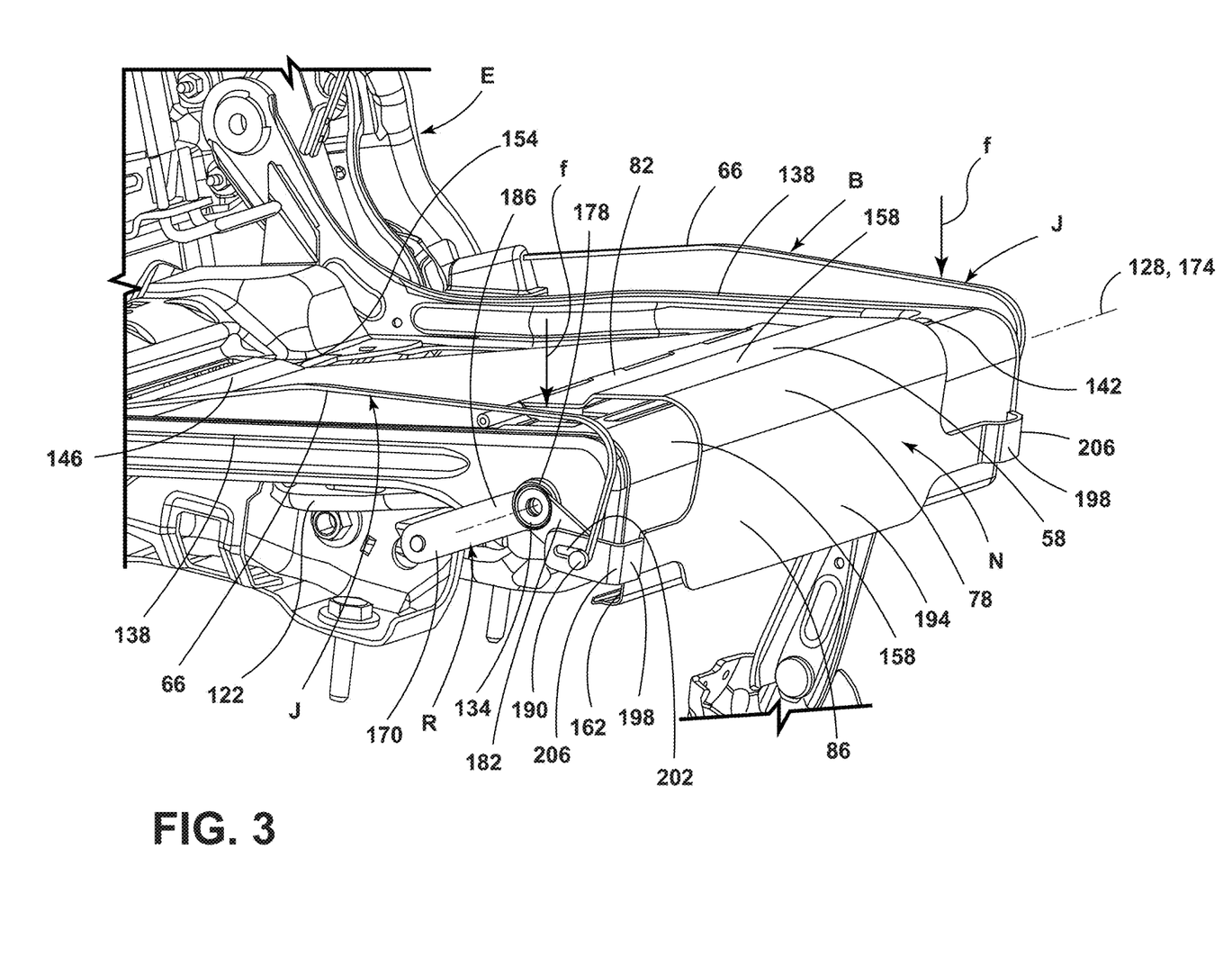
FIG. 3 is a right side perspective view of a portion of a seating assembly with a support assembly in a flattened position, according to an aspect of the disclosure.

Referring to FIGS. 1-3, the seating assembly 10 may include a support assembly 58. In the example shown, the support assembly 58 may include a pair of extension members 66, a pair of rotating members 134, and a plate 78. In the example shown, the seat frame 18 may include a pair of opposing side brackets 138, a front cross member 142, and a rear cross member 146. The seat frame 18 may include a front portion 150 and a rear portion 154. An end 70 of each of the extension members 66 may be fixedly coupled to each of the opposing side brackets 138. An end 74 of each of the extension members 66 may be coupled to the adjustment devices (for example, rotating members 134) disposed on each of the side brackets 138.

With continuing reference to FIGS. 1-3, the extension members 66 may be disposed in the extended position I or the compressed position J. A front wall 158 may extend along the front cross member 142. The front wall 158 may be curved. The front wall 158 may provide a comfortable surface for support of the calves of an occupant. The front wall 158 may include an inward-extending portion 162 that may be curved under the seat 50.

Referring again to FIGS. 1-3, the support assembly 58 may include a plate 78 for supporting the thighs and knees of a seated occupant. The plate 78 may include a first side 82 that may be pivotably coupled to the seat frame 18. The first side 82 of the plate 78 may rotate about a support assembly axis of rotation 166 disposed in the seat frame 18. The second side 86 of the plate 78 may be slidably coupled to adjustment mechanisms (for example, rotating member 134) disposed at the front portion 150 of the seat frame 18. The plate 78 may be moved between a raised position M and a lowered position N.

Referring again to FIGS. 1-3, adjustment mechanisms (for example, rotating members 134) for moving the extension members 66 between the extended position I and the compressed position J may be disposed on opposing sides of the seat frame 18. The pair of rotating members 134 may include a pair of brackets 170. The rotating members 134 may move from the initial position Q to the final position R as the extension members 66 move from the extended position I to the compressed position J in response to an actuation force f disposed on the extension members 66. The bracket 170 may be rotatable about a bracket axis of rotation 174 extending through the pivotable coupling 178 and the front portion 150 of the seat frame 18. The bracket axis of rotation 174 may be transverse to the extension members 66. In the example shown, the bracket 170 includes first and second links 182, 186. The first and second links 182, 186 each extend outward from the pivotable coupling 178. The first link 182 includes a pin 190. The extension member 66 may be coupled to the pin 190. In addition to the shape of the bracket 170 shown, the bracket 170 may include a variety of other shapes, configurations, and structures.

With continued reference to FIGS. 1-3, the plate 78 may be coupled to the first link 182 of the bracket 170. The plate 78 may include a central portion 194 and two outward-extending portions 198. The plate 78 may support the thighs and the knees of a seated occupant. The two outward-extending portions 198 may extend along the front wall 158 and include bends 206 of approximately 90 degrees may cause the outward-extending portions 198 to extend backward so that they may be coupled with the first link 182 of the bracket 170. The two outward-extending portions 198 may each include a slot 202. A pin 190 may extend from the first link 182 and into the slot 202. The extension members 66 may be fixedly attached to the pins 190. The bend 206 may increase the structural rigidity of each of the two outward-extending portions 198.

With continued reference to FIGS. 1-3, a flange 210 may extend transversely away from the second link 186 and in a direction toward a bottom of the seat 50. The flange 210 may abut a structural component of the seat 50 to limit rotation of the bracket 170 in the initial position Q and the final position R. In the example shown, the structural component includes a seat leg 122. In one aspect, the flange 210 may be welded to the seat leg 122. The flange 210 may be referred to as a stop member. In addition to the rectangular shape of the flange 210 shown, the flange 210 may include a variety of other shapes, configurations, and structures. In one example, the flange 210 may be mounted on the seat leg 122 or another structure at such a position that the first link 182 or the second link 186 of the bracket 170 abuts the flange 210 in the initial position Q and the final position R of the bracket 170 to generally limit rotation of the bracket 170. The bracket 170 may be positioned on the side bracket 138 to minimize interference of the bracket 170 with a seated occupant and to provide space for the bracket 170 to rotate.

With continued reference to FIGS. 1-3, a first seat leg axis of rotation 128 may extend through the seat leg 122 and the seat frame 18. A second seat leg axis of rotation 130 may extend through the seat leg 122 proximate the vehicle floor 126. As the seatback 54 is moved from an upright position E to a folded position F, the seat 50 may move forward and downward. The seat leg 122 may move from an upward position S to a downward position T as the seating assembly 10 moves to the folded position F to allow for creation of a load floor 30 by the seatback panel 26.

Figure 4:
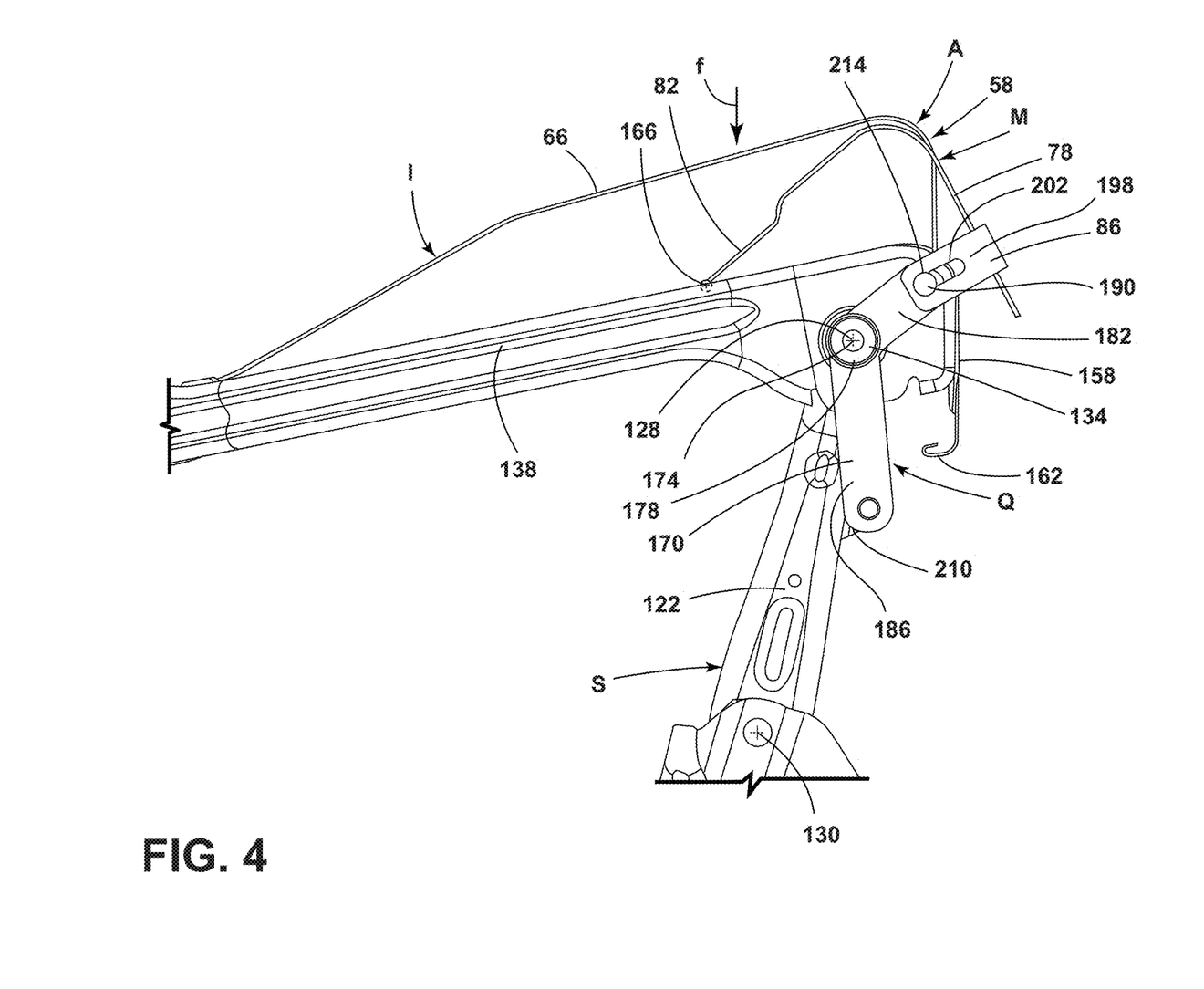
FIG. 4 is a right side elevational view of a portion of a seating assembly with a support assembly in the elevated position, according to an aspect of the disclosure.
Figure 5:
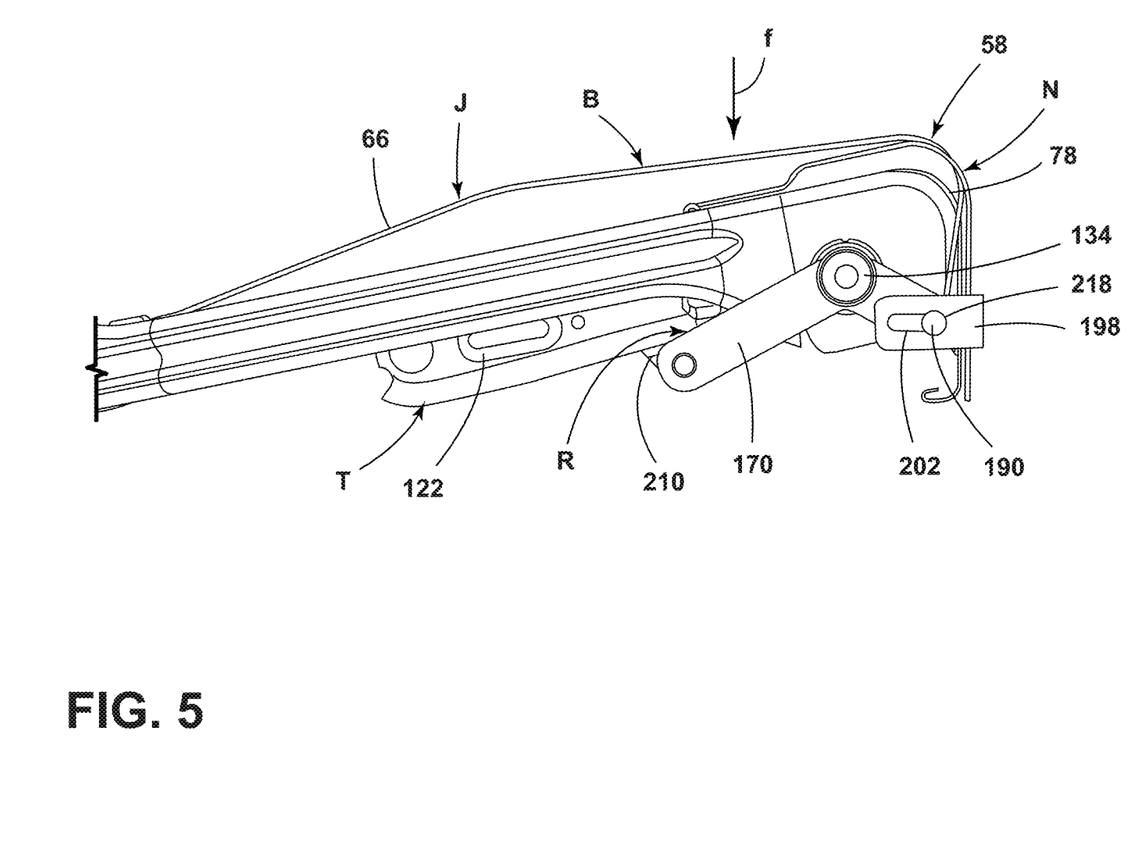
FIG. 5 is a right side elevational view of a portion of a seating assembly with a support assembly in the flattened position, according to an aspect of the disclosure.

Referring now to FIGS. 4-7, the flange 210 may move from the initial position Q to the final position R as the seat leg 122 moves from the upward position S to the downward position T. With reference to FIGS. 4 and 5, the support assembly 58 may be in the elevated position A (FIG. 4) and the flattened position B (FIG. 5). In the elevated position A of the support assembly 58, the plate 78 may be in the raised position M, the extension member 66 may be in the extended position I, and the bracket 170 may be in the initial position Q. The outward-extending portion 198 of the plate 78 may be coupled to the bracket 170 such that the pin 190 extending from the first link 182 of the bracket 170 may be disposed in the end 214 of the slot 202. The flange 210 may be disposed against the seat leg 122 in the upward position S.

Referring to FIG. 5, in the flattened position B of the support assembly 58, the plate 78 may be in the lowered position N, the extension member 66 may be in the compressed position J, and the bracket 170 may be in the final position R. The outward-extending portion 198 of the plate 78 may be coupled to the bracket 170 such that the pin 190 extending from the first link 182 of the bracket 170 may be disposed in the end 218 of the slot 202. The flange 210 may be disposed against the seat leg 122 in the downward position T.

With continued reference to FIGS. 4-5, it is contemplated that a variety of couplings between the rotating member 134 and the plate 78 could allow for movement of the support assembly 58 between the elevated position A and the flattened position B. In one aspect, a pin may be disposed on the outward-extending portion 198, and a slot 202 may be disposed on the bracket 170. In another aspect, a biased member could be used instead of the pin 190 and the slot 202. It is also contemplated that the slot 202 may have various shapes to accommodate various movements of the support assembly 58 between the elevated position A and the flattened position B.

Figure 6:
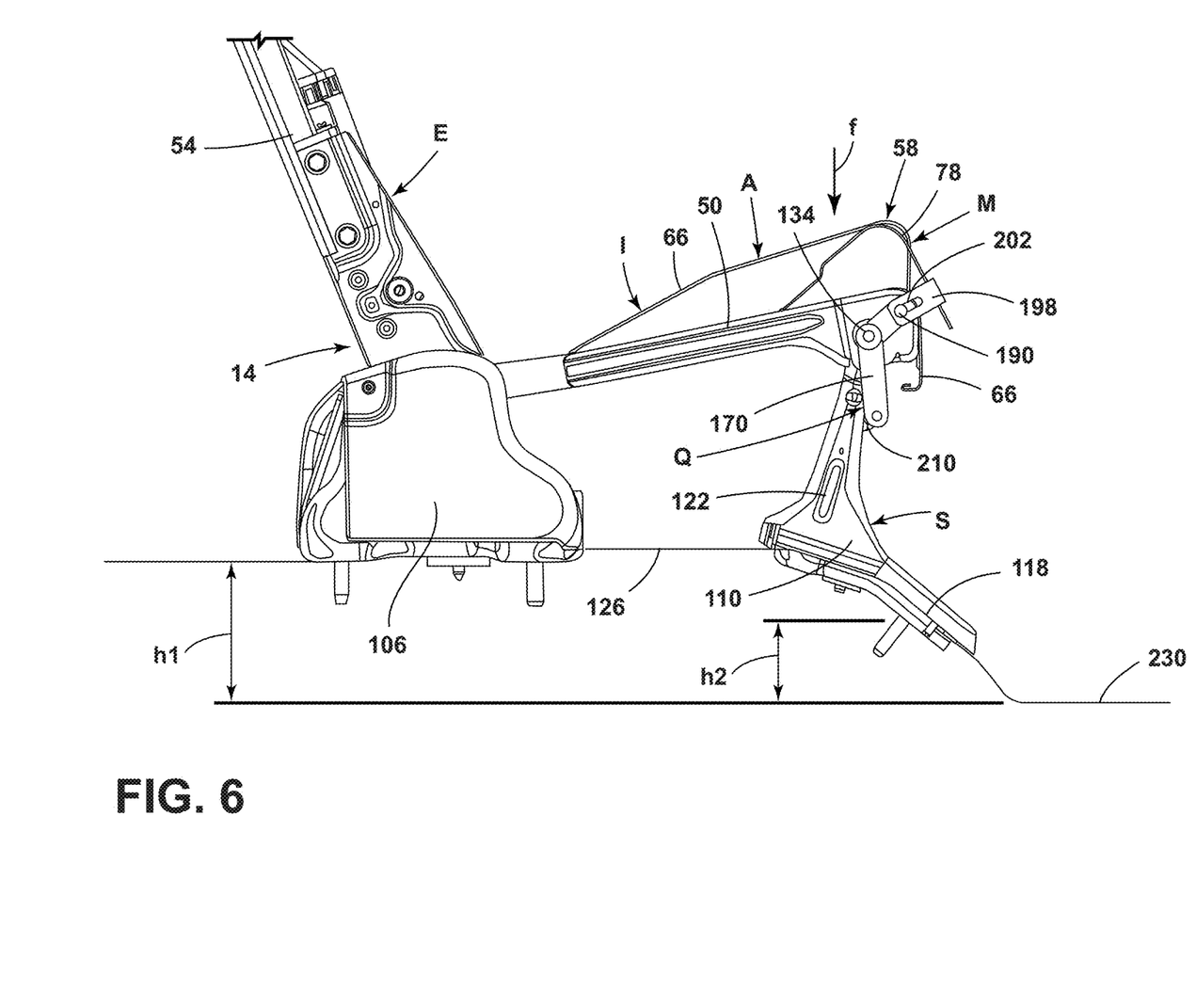
FIG. 6 is a right side elevational view of a portion of the seating assembly with the seatback in the upright position and the seating assembly with the seatback in the folded position, according to an aspect of the disclosure.

Referring now to FIGS. 6-7, the seating assembly 10 is shown in the upright position E and the folded position F. The seating assembly 10 is shown mounted to a vehicle floor 126 that includes a first height h1 at the rear mount 106 and a second height h2 at the base 118 of the front mount 110. The first height h1 may include the distance between the level of the foot area 230 and the portion of the rear mount 106 that may be disposed above the vehicle floor 126. The second height h2 may include the distance between the level of the foot area 230 and the portion of the front mount 110 that may be disposed above the vehicle floor 126. As the seating assembly 10 moves from the upright position E to the folded position F, the seating assembly frame 14 may move downward and forward, and the seat leg 122 may move from the upward position S to the downward position T. As such, the flange 210 disposed against the seat leg 122 may move from the initial position Q to the final position R as the bracket 170 may rotate about the bracket axis of rotation 174. As such, the support assembly 58 may be compactly stored in the flattened position B if the seatback 54 is in the folded position F. It should be understood that it may be advantageous to have a substantially flat load floor 30 for cargo storage.

In various aspects of the disclosure, the extension member 66 may be made of metal, composite, or another material. A metal extension member 66 may include a spring steel. The extension member 66 may be stiff or flexible. The extension members 66 may include bolster wires that may be made of steel. The bolster wires may also be made of a composite, a carbon fiber and epoxy resin mixture, or other materials.

It is to be understood that powered actuation may be used to move an extension member 66 between an extended position I and a compressed position J. A power actuator for moving an extension member 66 between an extended position I and a compressed positon J may include a cable actuator. A power actuator for moving an extension member 66 between a compressed position J and an extended position I may include a cable actuator.

It is to be understood that the extension members 66 may have different cross-sectional areas and shapes along their lengths. The extension members 66 may include segments of various materials and sizes.

It is to be understood that the support assembly 58 may be biased in a variety of ways to return to the elevated position A from the flattened position B upon removal of the actuation force f. It is to be understood that the extension members 66 may be biased in a variety of ways to return to the extended position I from the compressed position J upon removal of the actuation force f. It is to be understood that the plate 78 may be biased in a variety of ways to return to the raised position M from the lowered position N upon removal of the actuation force f Additionally, the adjustment device may include a biasing mechanism that may store energy when the support assembly 58 moves from an elevated position A to a flattened position B and that may release energy to move the support assembly 58 from a flattened position B to an elevated position A. The adjustment device may include a biasing mechanism that may store energy when the extension member 66 moves from an extended position I to a compressed position J and that may release energy to move the extension member 66 from a compressed position J to an extended position I. The adjustment device may include a biasing mechanism that may store energy when the plate 78 is moved from the raised position M to the lowered position N and that may release energy to move the plate 78 from the lowered position N to the raised position M.

It is to be understood that the actuation force f may be exerted by the seatback 54 in the folded position F and/or in another manner (for example, by disposing a heavy object across the seat 50).

A variety of advantages may be obtained by use of the present disclosure. A support assembly 58 may be incorporated into a seating assembly 10 and may be flattened to reduce the contours of the bolsters 94 and the leg support 98. Movement of the support assembly 58 to a flattened position B when an actuation force f is disposed on the support assembly 58 may allow for a seatback 54 to form a substantially flat load floor 30 when the seatback 54 is in the folded position F. Utilization of the seating assembly 10 with the support assembly 58 in the elevated position A may provide comfort and support to an occupant of the seating assembly 10. The support assembly 58 may be integrated with the seat frame 18. A seat cushion 42 and/or trim may be disposed over the support assembly 58 to create a pleasing appearance of the seating assembly 10.

Aspects of the present disclosure are also disclosed in co-pending, commonly assigned to Ford Global Technologies, LLC application 84313811 entitled Adjustment Mechanism for Seating Assembly Member, the entire disclosure of which is hereby incorporated herein by reference.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
    a seatback; and
    a seat including:
        a seat frame; and
        a support assembly coupled to the seat frame and movable between an elevated position and a flattened position in response to an actuation force applied on the support assembly and including:
            an extension member having a first end fixedly coupled to the seat frame and a second end rotatably coupled to the seat frame; and
            a plate having a first side rotatably coupled to the seat frame and a second side slidably coupled to the seat frame.

2. The vehicle seating assembly of claim 1, wherein the support assembly further includes
    an adjustment mechanism rotatably coupled to the seat frame, fixedly coupled to the extension member, and slidably coupled to the plate.

3. The vehicle seating assembly of claim 2, wherein the adjustment mechanism is rotatable about an adjustment mechanism axis of rotation extending through the seat frame and between an initial position and a final position as the support assembly moves from the elevated position to the flattened position.

4. The vehicle seating assembly of claim 3, wherein the actuation force includes a force exerted by the seatback in a folded position on the support assembly as the seatback moves from an upright position to the folded position.

5. The vehicle seating assembly of claim 4, further comprising:
    a seat leg disposed between the seat and a floor, wherein the seat leg moves from a first position to a second position as the seatback moves from the upright position to the folded position.

6. The vehicle seating assembly of claim 5, wherein the seat leg includes a first end rotatable about a first seat leg axis of rotation extending through the seat frame and a second end rotatable about a second seat leg axis of rotation proximate the floor.

7. The vehicle seating assembly of claim 6, wherein the adjustment mechanism includes a stop member disposed against the seat leg if the adjustment mechanism is in the initial position and the seat leg is in the first position and wherein the adjustment mechanism includes the stop member disposed against the seat leg if the adjustment mechanism is in the final position and the seat leg is in the second position.

8. The vehicle seating assembly of claim 7, wherein the adjustment mechanism rotates about the adjustment mechanism axis of rotation and between the initial position and the final position of the adjustment mechanism as the second end of the seat leg rotates about the second seat leg axis of rotation as the seat leg moves from the first position to the second position.

9. The vehicle seating assembly of claim 8, wherein the first seat leg axis of rotation and the adjustment mechanism axis of rotation are the same.

10. The vehicle seating assembly of claim 9, wherein the adjustment mechanism includes a bracket having a first link and a second link.

11. The vehicle seating assembly of claim 10, wherein the first link is fixedly coupled to the extension member and slidably coupled to the plate.

12. The vehicle seating assembly of claim 11, wherein the second link includes the stop member.

13. The vehicle seating assembly of claim 12, wherein the extension member includes a pair of opposing extension members disposed on opposing sides of the seat frame, wherein the adjustment mechanism includes a pair of opposing adjustment mechanisms disposed on opposing sides of the seat frame, and wherein the plate extends between each of the pair of opposing adjustment mechanisms.

14. The vehicle seating assembly of claim 13, wherein the pair of opposing extension members include bolsters and wherein the plate includes a leg support.

15. A vehicle seating assembly comprising:
    a seat;
    a seatback; and
    a support assembly disposed on a seat frame and movable between an elevated position and a flattened position in response to an actuation force and including:
        a plate having:
            a first side rotatably coupled to the seat frame; and
            a second side rotatably coupled to the seat frame, wherein the support assembly includes a pair of opposing extension members disposed along side brackets of a seating assembly frame, and wherein the plate extends between each of the pair of extension members and transverse to each of the pair of extension members.

16. The vehicle seating assembly of claim 15, wherein the support assembly includes one or more rotating members coupled to the seating assembly frame, the pair of opposing extension members, and the plate, and wherein the one or more rotating members are movable between an initial position and a final position as the support assembly moves between the elevated position and the flattened position.

17. The vehicle seating assembly of claim 16, further comprising:
    a stop member coupled to the seating assembly and configured to limit rotation of the one or more rotating members in the initial position and the final position.

18. The vehicle seating assembly of claim 17, wherein the second side of the plate is coupled to the one or more rotating members with a slot and a pin.

19. A vehicle seating assembly comprising:
    a seat frame;
    a front mount disposed between the seat frame and a floor and including:
        a seat leg movable between an upward position and a downward position; and
    a support assembly movable between an elevated position and a flattened position in response to an actuating force and including:
        a stop member abutting the seat leg and configured to limit movement of the support assembly if the seat leg is in the upward position and if the seat leg is in the downward position.

* * * * *